United States Patent Office 3,478,541
Patented Nov. 18, 1969

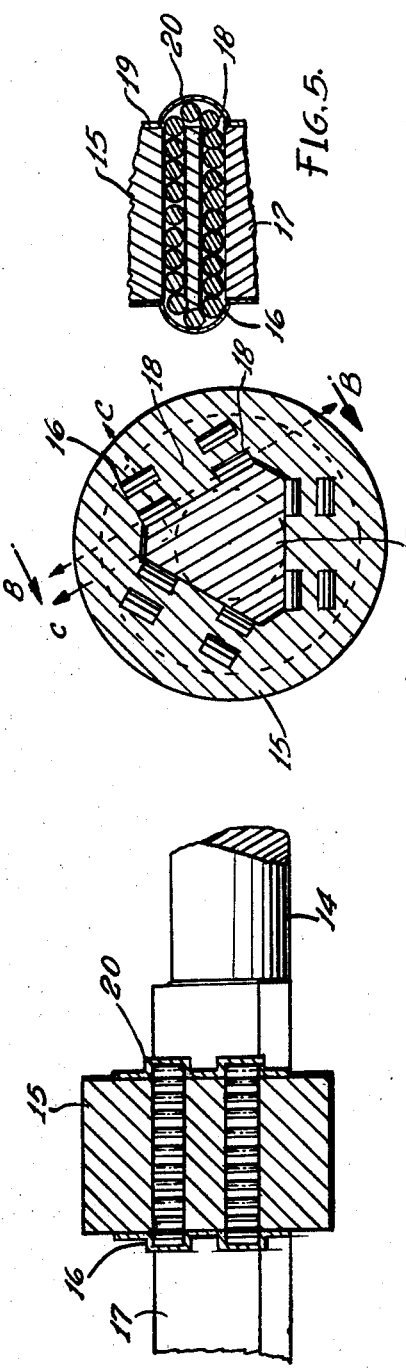
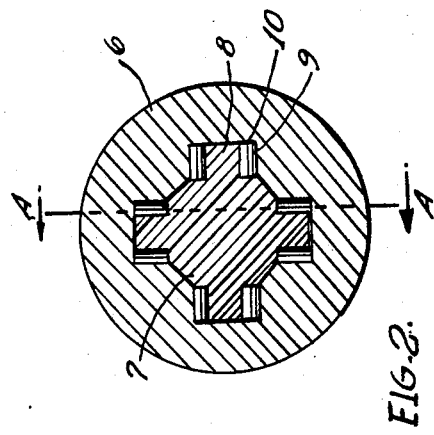
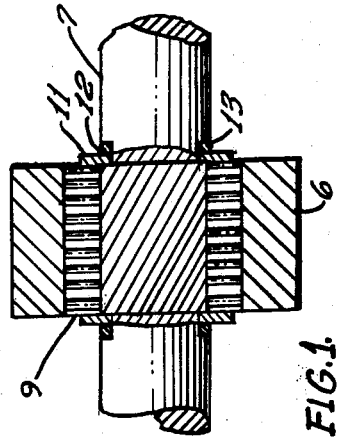

3,478,541
ROLLER BEARING SPLINES
Daniel F. McGill, Portland, Oreg., and Alfred T. McGill, 511 SE. Belmont St., Portland, Oreg. 97214; said Daniel F. McGill assignor to said Alfred T. McGill
Filed Jan. 8, 1968, Ser. No. 697,557
Int. Cl. F16d 3/06
U.S. Cl. 64—23.7                     3 Claims

ABSTRACT OF THE DISCLOSURE

A spline mechanism for transmitting rotary torque from a driving member to a driven member which is provided with a plurality of anti-friction roller bearing means mounted to ride in respective axially-extending endless track channels situated in the interface between said members so as to permit friction-free axial movement of one member relative to the other.

---

This invention relates to improvements in spline mechanisms for transmitting torque from a driving member to a driven member. The prime object of the present invention is to provide a spline that will permit axial movement of one of its members without transmitting axial thrust movement to its opposite member while operating torque and radial loads.

Another object is to provide an anti-friction spline between two members, one of which may have a limited or unlimited axial movement without transferring axial thrust movement to its opposite member while operating under heavy radial and torque loads.

Another object is to provide an anti-friction spline that will permit the axial movement of the driving member without transmitting axial thrust movement to its driven member.

Another object is to provide an anti-friction roller bearing spline between the operating shaft and the rotor in a pump mounted between face plates preventing axial thrust from the shaft crowding the lubrication out from between the rotor and one of the face plates, permitting a metal to metal contact causing wear and scoring.

Another object is to provide an anti-friction roller bearing spline that its load carrying capacity can be controlled by the sum of the length of its rollers.

The big advantage of the anti-friction roller bearing spline over the anti-friction ball bearing spline is that the bearing contacts of the balls on the bearing surface are so small that they indent the parallel surfaces, permitting a back lash which pounds the bearing to pieces. ¼ inch diameter rollers ¼ inch long provide approximately 50 times the bearing surface as that of the ¼ inch diameter ball in the anti-friction ball bearing spline, permitting heavier loads without damage to the bearing surfaces.

Roller bearing splines can be fitted with internal gears, or sprockets, clutching devices, trunnions, pump rotors, reciprocating heads of internal grinding machines and many other applications that occur to persons skilled in the art.

This invention will be better understood and additional objects and advantage will become apparent from the following description with the accompanying drawings, which illustrates some of the forms in which the invention may be used. It is to be understood however, the invention may take other forms and that all such modifications and variations within the scope of the appended claims, which will occur to persons skilled in the art, are included in the invention.

In the drawings:
FIGURES 1 and 2 are the limited type.
FIGURE 1 is a longitudinal sectional view taken on line A—A in FIGURE 2.
FIGURE 2 is a cross section view of FIGURE 1.
FIGURES 3, 4 and 5 are the unlimited type.
FIGURE 3 is a longitudinal view taken on line B—B in FIGURE 4, showing a roller carriage having various length of travel.
FIGURE 4 is a cross section of FIGURE 3.
FIGURE 5 is a cross sectional view taken through line C—C in FIGURE 4, showing the rollers mounted in a closed circuit for recirculation.

In the specifications:
Number 6 represents the rotor or roller carriage and 7 the operating shaft with 8 representing the four non-standard splines on shaft 7 in FIGURE 2. Rollers 9 are mounted between parallel surfaces on spline 8 on shaft 7 and spline 10 in rotor 5, providing spline means for driving rotor or carriage 6 as shaft 7 is rotated, forming anti-friction bearing splines, permitting shaft 7 to roll on rollers 9 while rotating rotor 6 under heavy torque and radial loads without transferring axial thrust movement to rotor carriage 6. As shaft 7 moves axially, rollers 9 will roll axially on spline 10 one-half the distance of the axial movement of shaft 7 with little or no thrust movement transferred from shaft 7 to rotor 6.

All operating shafts have axial movement and unless means are provided to accommodate this movement, its axial thrust will transfer to the driven member, which in many applications is very detrimental.

In some applications it may be desirable that the driving shaft be splined to the driven shaft; while not shown specifically as the driven shaft in the drawings, it is to be understood that such applications are covered by the claims. In such applications the driven member would represent the driven shaft.

While not shown in the drawings, if rotor 6 was operating as a pump rotor and mounted on shaft 7 for operation, shaft 7 would be mounted on bearings in the pump housing and held to a limited axial movement by snap rings, permitting shaft 7 movement axially only to the extent of the clearance necessary to mount the snap ring, which is approximately .003 of an inch.

High pressure pumps must run with a clearance of not more than ¼ thousandth between the rotor and each of the face plates for lubrication; therefore, .003 of an inch shaft movement would force the lubrication from between the rotor and one of the face plates with the high fluid pressure on the opposite end of the rotor only, permitting hydraulic unbalance of the rotor, causing a metal to metal contact resulting in wear and scoring while the pump is in operation.

An anti-friction roller bearing spline will permit the rotor to hydraulically float between the face plates regardless of the axial shaft movement while the spline is under a driving torque load.

Since axial movement of shaft 7 will be short in such applications and with the rollers moving only one-half the distance of shaft 7, its movement with resilient means provided, will permit only a small axial movement of rollers 9. The resilient means comprising snap rings 11 on shaft 7 at each end of rotor 6 with O' rings 12 fitting into snap ring grooves 13, providing the axial flexibility.

The rollers must be held centrally located in member 6, so they can roll axially in either direction to accommodate the limited axial movement of shaft 7. O' rings 12 in grooves 13 are shown to provide the resiliency means holding rollers 9 centrally located, so as to permit them to freely roll in either direction one-half the distance of the movement of shaft 7 without transferring end thrust to rotor 6. If rollers 9 were against one of snap rings 11 and shaft 7 were to move axially toward the snap ring, the roller would lock and not roll, thereby transferring end thrust from shaft 7 to rotor 6, forcing it against one of the face plates, crowding out the lubrication causing hydraulic unbalance of the rotor, resulting in wear and scoring. This happens when using a standard spline that will not permit slip under a torque load in high pressure pumps, or in other installations where end thrust is harmful. A standard spline under torque load becomes a solid connection.

Other flexible means may be used to suit its particular application.

FIGURE 3 shows means of providing unlimited axial movement of either shaft 14 or roller bearing carriage 15 on anti-friction rollers 16 with the least possible thrust transferred to its opposite member when under heavy torque and radial loads.

FIGURE 3 is taken through line B—B in FIGURE 4, with rollers 16 mounted between carriage 15 bearing surfaces 18 and shaft 14 bearing surfaces 17 forming an antifriction bearing spline between shaft 14 and carriage 15. There are six splines shown on shaft 14. Carriage 15 is shown with bearing surfaces 18 divided by sections 18a at each triangle side of bearing surfaces 17 on shaft 14. Sections 18a may be eliminated, permitting rollers 16 to extend the full length of bearing surfaces 17 on shaft 14. Shaft 17 is shown with three parallel surfaces having rollers mounted between them and the parallel surfaces on carriage 15; however, a greater number of opposing parallel surfaces and rollers may be used to accommodate a particular installation.

FIGURE 5 is a cross section view taken through line C—C in FIGURE 4 showing ports 19 in carriage 15 with caps 20 forming a closed circuit for recirculation of rollers 16, permitting either member to move axially relative to its opposite member to the full length of axial travel on shaft 14.

Ports 19 may be made through carriage 15 as shown in the drawing or formed by a stamping fitted on carriage 15. Caps 20 are also shown in dottel lines in FIGURE 4.

Having now described our invention and in what manner it may be used, what we claim is new and we desire to protect this by Letters Patent:

1. A rotary spline mechanism comprising: a driving and a driven member mounted coaxially for rotation as a unit, each said member having formed axially thereon in the interface between said members an opposing set of elongated parallel surfaces; anti-friction rollers of cylindrical shape mounted in said interface between corresponding opposing ones of said elongated parallel surfaces on said respective members and providing rolling contact therebetween, said set of parallel surfaces on one of said members being shorter axially than on the other said member; a second set of elongated parallel surfaces formed axially on one of said members in line with and in one-to-one correspondence with its said first set of parallel surfaces; curved means connecting respective ones of said first set of parallel surfaces on said one member with said second set of parallel surfaces so as to form continuous channel circuits therebetween for said rollers; whereby an antifriction roller bearing spline is provided for locking said members to rotate as a unit while permitting relative axial movement between said members in either direction without transferring axial thrust to its other member.

2. The rotary spline mechanism of claim 1 characterized in that said rollers are in the form of needle bearings having a small diameter relative to its length.

3. A rotary spline mechanism comprising a driving and a driven member coaxially mounted for rotation as a unit, each said member having an opposing set of parallel surfaces formed in the periphery thereof and extending longitudinally of the axis of said member, one of said members being shorter axially than the other said member, a second set of parallel surfaces formed in said shorter member corresponding to and in alignment with respective ones of said first set of parallel surfaces, arcuate channels formed on each end of said shorter member connecting respective ones of its first and second sets of parallel surfaces so as to provide continuous channel circuits therebetween, anti-friction rollers of cylindrical shape mounted in said channel circuits providing rolling contact between said driving and driven members, whereby an anti-friction roller bearing spline construction is provided for locking said members to rotate as a unit while permitting unlimited axial movement in either direction between said members to the length of the longer member without transferring axial thrust to said other member.

References Cited

UNITED STATES PATENTS

| | | | |
|---|---|---|---|
| 1,690,714 | 11/1928 | Braddock | 64—23 |
| 2,225,929 | 12/1940 | Sarazin | 64—23 |
| 2,979,147 | 4/1961 | Naumann | 64—23 X |
| 3,203,202 | 8/1965 | Brownyer | 64—23 |
| 3,279,218 | 10/1966 | Chocholek et al. | 64—23 |
| 3,360,308 | 12/1967 | Grabowski et al. | 64—23.7 |

FOREIGN PATENTS

| | | |
|---|---|---|
| 513,421 | 10/1939 | Great Britain. |
| 679,843 | 9/1952 | Great Britain. |

HALL C. COE, Primary Examiner

U.S. Cl. X.R.

308—6